(12) United States Patent
Harvey et al.

(10) Patent No.: US 10,943,413 B1
(45) Date of Patent: *Mar. 9, 2021

(54) SYSTEMS AND METHODS FOR MAINTAINING A SELF-DRIVING VEHICLE

(71) Applicant: State Farm Mutual Automobile Insurance Company, Bloomington, IL (US)

(72) Inventors: Brian N. Harvey, Bloomington, IL (US); Nathan L. Tofte, Downs, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,994

(22) Filed: Jan. 16, 2020

Related U.S. Application Data

(63) Continuation of application No. 16/016,826, filed on Jun. 25, 2018, now Pat. No. 10,573,096, which is a continuation of application No. 14/795,797, filed on Jul. 9, 2015, now Pat. No. 10,049,505.

(60) Provisional application No. 62/127,700, filed on Mar. 3, 2015, provisional application No. 62/126,258, filed on Feb. 27, 2015.

(51) Int. Cl.
| | |
|---|---|
| *G06Q 40/08* | (2012.01) |
| *G06Q 10/08* | (2012.01) |
| *G06Q 50/30* | (2012.01) |
| *G06Q 50/28* | (2012.01) |
| *G07C 5/00* | (2006.01) |

(52) U.S. Cl.
CPC ............. *G07C 5/008* (2013.01); *G06Q 40/08* (2013.01)

(58) Field of Classification Search
CPC .... G06Q 50/30; G06Q 10/06; G06Q 10/0631; G06Q 10/1095; G06Q 40/08; G06Q 10/08; G06Q 50/28
USPC .......................................................... 705/4
See application file for complete search history.

(56) References Cited

U.S. PATENT DOCUMENTS

| | | | |
|---|---|---|---|
| 5,797,134 | A  | 8/1998  | McMillan et al. |
| 6,064,970 | A  | 5/2000  | McMillan et al. |
| 6,677,854 | B2 | 1/2004  | Dix |
| 6,972,669 | B2 | 12/2005 | Saito et al. |
| 7,024,291 | B2 | 4/2006  | Sudou |

(Continued)

*Primary Examiner* — Hao Fu
(74) *Attorney, Agent, or Firm* — Armstrong Teasdale LLP

(57) ABSTRACT

A computer-based method for maintaining an autonomous or self-driving vehicle is provided. The method is implemented using a vehicle controlling ("VC") computer device installed on the vehicle. The method may include determining that a maintenance operation is required for the self-driving vehicle, retrieving an operator schedule for an operator of the self-driving vehicle, retrieving a facility schedule for a facility, determining a time for performing the maintenance operation based upon the operator schedule, the facility schedule, and an amount of time required to (i) complete the maintenance operation, (ii) drive the self-driving vehicle from a first location to the facility to arrive at the determined time, and (iii) drive the self-driving vehicle to a second location, instructing the self-driving vehicle to drive from the first location to the facility to arrive at the determined time; and/or instructing the self-driving vehicle to drive from the facility a second location.

20 Claims, 6 Drawing Sheets

(56) References Cited

U.S. PATENT DOCUMENTS

| | | | |
|---|---|---|---|
| 7,313,471 | B2 | 12/2007 | Roberts |
| 7,356,393 | B1 | 4/2008 | Schlatre et al. |
| 8,060,274 | B2 | 11/2011 | Boss et al. |
| 8,190,322 | B2 * | 5/2012 | Lin .................... G07C 5/008 |
| | | | 701/31.5 |
| 8,280,752 | B1 | 10/2012 | Cripe et al. |
| 8,620,714 | B2 | 12/2013 | Williams et al. |
| 8,958,943 | B2 | 2/2015 | Bertosa et al. |
| 9,791,861 | B2 * | 10/2017 | Keohane ............. G05D 1/0088 |
| 2006/0261933 | A1 | 11/2006 | Deniau et al. |
| 2009/0099720 | A1 | 4/2009 | Elgali |
| 2013/0325541 | A1 | 12/2013 | Capriotti et al. |

\* cited by examiner

SYSTEMS AND METHODS FOR MAINTAINING A SELF-DRIVING VEHICLE

CROSS-REFERENCE TO RELATED APPLICATIONS

This application is a continuation of, and claims the benefit of priority to, U.S. patent application Ser. No. 16/016,826, filed Jun. 25, 2018 and entitled "Systems and Methods for Maintaining a Self-Driving Vehicle," which is a continuation of, and claims the benefit of priority to, U.S. patent application Ser. No. 14/795,797, filed Jul. 9, 2015 and entitled "Systems and Methods for Maintaining a Self-Driving Vehicle," which claims the benefit of priority to U.S. Provisional Patent Application Ser. No. 62/127,700, filed Mar. 3, 2015, and of U.S. Provisional Patent Application Ser. No. 62/126,258, filed Feb. 27, 2015, the contents of all of which are hereby incorporated by reference herein in their entireties and for all purposes.

FIELD OF THE DISCLOSURE

The present disclosure generally relates to maintaining a self-driving vehicle and, more particularly to systems and methods for scheduling and tracking maintenance for a self-driving vehicle.

BACKGROUND

Self-driving vehicles (also known as driverless cars and robotic vehicles) use data from a plurality of sensors to detect their surroundings. The self-driving vehicles use the data to determine current conditions around the self-driving vehicle and make decisions about the operation of the self-driving vehicle based upon those current conditions. To ensure the accuracy of the data from the plurality of sensors, each of the sensors needs to be precisely aligned and calibrated. In addition, the systems that act based upon the data, such as steering, braking, and acceleration, need to be precisely aligned, as well to prevent issues, such as over steering and to ensure that the self-driving vehicle actually goes where desired and planned. Over time, the alignment and/or calibration of these sensors and systems may change. Thus, it may be necessary for the sensors and other systems of the self-driving vehicles to be strictly maintained to the manufacturer's specifications to ensure proper operation.

However, many people may ignore the manufacturer's maintenance specifications, thus leading to potential issues with the operation of their vehicles. For example, some vehicle owners may not take the time to go to a maintenance facility to have their vehicle maintained. It may be advisable to ensure the operational safety of self-driving vehicles by getting issues corrected sooner rather than later. Self-driving vehicle owners who ignore maintenance may create dangerous conditions for self-driving vehicles that depend on the plurality of sensors and other systems to enable proper and safe operation of the self-driving vehicles.

BRIEF SUMMARY

A self-driving vehicle may include a plurality of sensors and a self-driving vehicle controller (also known as a vehicle controlling ("VC") computer device). The plurality of sensors may detect the current surroundings and location of the self-driving vehicle. The plurality of sensors may include, but are not limited to, radar, LIDAR, Global Positioning System (GPS), and computer vision. The self-driving vehicle controller may interpret the sensory information to identify appropriate navigation paths, as well as obstacles and relevant signage. Additionally, the self-driving vehicle controller may control the direction and speed of the self-driving vehicle. The self-driving vehicle controller may allow the self-driving vehicle to travel from point A to point B without input from a human operator. The present embodiments may relate to systems and methods for scheduling maintenance for a self-driving vehicle. The method may be implemented using the vehicle controlling ("VC") computer device installed on a self-driving vehicle. The method may include determining that a maintenance operation is required for the self-driving vehicle, retrieving an operator schedule for an operator of the self-driving vehicle, retrieving a facility schedule for a facility selected to perform the maintenance operation, and/or determining a time for performing the maintenance operation based upon the operator schedule, the facility schedule, and/or an amount of time required to (i) complete the maintenance operation, (ii) drive the self-driving vehicle from a first location to the facility to arrive at the determined time, and/or (iii) drive the self-driving vehicle to a second location. The method may further include instructing the self-driving vehicle to drive from the first location to the facility to arrive at the determined time; and/or after completion of the maintenance operation, instructing the self-driving vehicle to drive from the facility a second location.

In one aspect, a computer-based method for maintaining a self-driving vehicle may be provided. The method may be implemented using a vehicle controlling ("VC") computer device installed on a self-driving vehicle. The VC computer device may be in communication with a memory. The method may include (1) determining by the VC computer device that a maintenance operation is required for the self-driving vehicle, and/or (2) retrieving by the VC computer device an operator schedule for an operator of the self-driving vehicle. The operator schedule may include a plurality of times and/or locations that the operator is required to be at over a period of time. The method may also include (3) retrieving by the VC computer device a facility schedule for a facility selected to perform the maintenance operation. The facility schedule may include a plurality of times that the facility is available to perform maintenance operations. The method may further include (4) determining by the VC computer device a time for performing the maintenance operation based upon the operator schedule, the facility schedule, and/or an amount of time required to (i) complete the maintenance operation, (ii) drive the self-driving vehicle from a first location to the facility to arrive at the determined time, and/or (iii) drive the self-driving vehicle to a second location. In addition, the method may include (5) instructing (by the VC computer device) the self-driving vehicle to drive from the first location to the facility to arrive at the determined time, and/or (6) after completion of the maintenance operation, instructing by the VC computer device the self-driving vehicle to drive from the facility a second location. The method may include additional, fewer, or alternative actions, including those discussed elsewhere herein.

In another aspect, a vehicle controlling ("VC") computer system used to schedule and perform maintenance on a self-driving vehicle may be provided. The VC computer system may be installed in a self-driving vehicle and the VC computer system may include at least one processor communicatively coupled to at least one memory device. The at least one processor may be programmed to determine that a maintenance operation is required for the self-driving vehicle and/or retrieve an operator schedule for an operator of the self-driving vehicle. The operator schedule may include a plurality of times and/or locations that the operator is scheduled to be at over a period of time. The at least one processor may be also programmed to retrieve a facility schedule for a facility selected to perform the maintenance operation. The facility schedule may include a plurality of times that the facility is available to perform maintenance operations. The at least one processor may be further programmed to determine a time for performing the maintenance operation based upon the operator schedule, the facility schedule, and/or an amount of time required to (i) complete the maintenance operation, (ii) drive the self-driving vehicle from a first location to the facility to arrive at the determined time, and/or (iii) drive the self-driving vehicle to a second location. In addition, the at least one processor may be programmed to instruct the self-driving vehicle to drive from the first location to the facility to arrive at the determined time, and/or after completion of the maintenance operation, instruct the self-driving vehicle to drive from the facility a second location. The at least one processor may be programmed to perform additional, fewer, or alternative actions, including those discussed elsewhere herein.

In yet another aspect, at least one non-transitory computer-readable storage media having computer-executable instructions embodied thereon may be provided. When executed by at least one processor, the computer-executable instructions may cause the processor to determine that a maintenance operation is required for a self-driving vehicle and retrieve an operator schedule for an operator of the self-driving vehicle. The operator schedule may include a plurality of times and locations that the operator is scheduled to be at over a period of time. The computer-executable instructions may also cause the at least one processor to retrieve a facility schedule for a facility selected to perform the maintenance operation. The facility schedule may include a plurality of times that the facility is available to perform maintenance operations. The computer-executable instructions may further cause the at least one processor to determine a time for performing the maintenance operation based upon the operator schedule, the facility schedule, and/or an amount of time required to (i) complete the maintenance operation, (ii) drive the self-driving vehicle from a first location to the facility to arrive at the determined time, and/or (iii) drive the self-driving vehicle to a second location. In addition, the computer-executable instructions may cause the at least one processor to instruct the self-driving vehicle to drive from the first location to the facility to arrive at the determined time, and after completion of the maintenance operation, instruct the self-driving vehicle to drive from the facility a second location. The computer-executable instructions may cause the at least one processor to perform additional, fewer, or alternative actions, including those discussed elsewhere herein.

In yet another aspect, a computer-based method for maintaining a self-driving vehicle may be provided. The method may include (1) determining, by a remote server in communication with the self-driving vehicle, that a maintenance operation is required for the self-driving vehicle and (2) generating, by the remote server, a first message representing the maintenance operation required for the self-driving vehicle. The method may further include (3) transmitting, by the remote server, the first message to the self-driving vehicle, wherein the first message causes the self-driving vehicle to perform automatic maintenance scheduling, the automatic maintenance scheduling including (a) retrieving an operator schedule for an operator of the self-driving vehicle, wherein the operator schedule includes a plurality of times and locations that the operator is scheduled to be at over a period of time; (b) retrieving a facility schedule for a facility selected to perform the maintenance operation, wherein the facility schedule includes a plurality of times that the facility is available to perform maintenance operations; (c) determining a time for performing the maintenance operation based upon the operator schedule, the facility schedule, and an amount of time required to (i) complete the maintenance operation, (ii) drive the self-driving vehicle from a first location to the facility to arrive at the determined time, and (iii) drive the self-driving vehicle to a second location; and (d) driving from the first location to the facility to arrive at the determined time. In addition, the method may also include (4) receiving, from the self-driving vehicle, a second message representing that the maintenance operation is complete. The method may include additional, fewer, or alternative actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the example processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
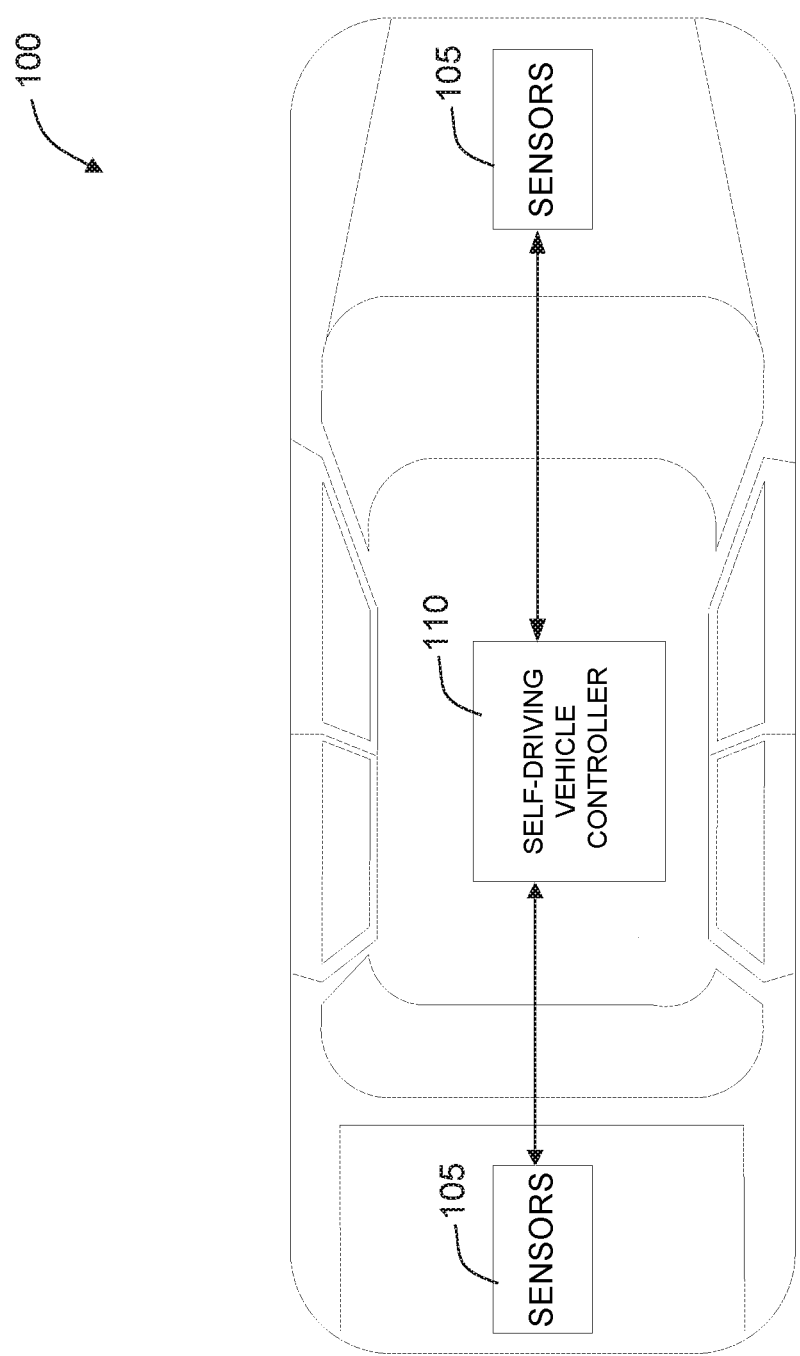
FIG. 1 illustrates a view of an exemplary self-driving vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for maintaining a self-driving vehicle. A self-driving vehicle may include a plurality of sensors and a self-driving vehicle controller (also known as a vehicle controlling ("VC") computer device). The plurality of sensors may detect the current surroundings and location of the self-driving vehicle. The plurality of sensors may include, but are not limited to, radar, LIDAR, Global Positioning System (GPS), and computer vision. The self-driving vehicle controller may interpret the sensory information to identify appropriate navigation paths, as well as obstacles and relevant signage. Additionally, the self-driving vehicle controller may control the direction and speed of the self-driving vehicle. The self-driving vehicle controller may allow the self-driving vehicle to travel from point A to point B without input from a human operator.

In the exemplary embodiment, the self-driving vehicle controller may include a communication device that allows it to communicate with other devices via the Internet. In the exemplary embodiment, the self-driving vehicle controller may be in communication with one or more client systems that are associated with one or more operators of the self-driving vehicle. Client systems may be computers that include a web browser or a software application to enable the self-driving vehicle controller to access the client system and vice versa using the Internet or a direct connection, such as a cellular network connection.

An operator of a self-driving vehicle may be an individual or plurality of individuals associated with the self-driving vehicle, where the operator is responsible for the well-maintained operation of the self-driving vehicle and/or may use the self-driving vehicle on a regular basis. For example, the operator may be an individual owner of the self-driving vehicle in the case of a personal automobile. The operator may be a group of people who share access to the self-driving vehicle, such as a family. Additionally, the operator may be a manager of a fleet of self-driving vehicles, such as an automated taxi service.

Each client system may store a schedule for the associated operator. The operator schedule may include a plurality of times and locations where the operator may be scheduled to be. For example, a schedule may include, but is not limited to, when the operator will be at work, when the operator will be at home, when the operator will be at meetings away from a primary work location, and/or when the operator is scheduled to transport family members and to what locations those family members are scheduled to be taken.

In the exemplary embodiment, the self-driving vehicle controller may also be in communication with one or more facility computer devices. The facility computer devices may be associated with maintenance facilities that are capable of and selected (either by the operator or the manufacturer of the vehicle) for performing maintenance operations on the self-driving vehicle. Each facility computer device may store a schedule for the associated maintenance facility. The facility schedule may include, but is not limited to, when the maintenance facility may be scheduled to perform other maintenance operations, what maintenance operations the maintenance facility may be capable of performing, at what times the maintenance facility may be available to perform maintenance operations, and/or a length of time needed to perform different maintenance operations for such vehicles.

As described below in more detail, the self-driving vehicle controller may be configured to determine that a maintenance operation is required or needed for a self-driving vehicle. This determination may be (i) based upon an error message from a sensor or other system of the self-driving car, (ii) based upon reaching a predetermined operation threshold, such as mileage, (iii) based upon a message from the operator of the vehicle; and/or (iv) based upon a message from a remote server, such as a facility computer device or a remote server maintained and/or operated by a third party. The third party may include, for example, a manufacturer of the vehicle, a maintenance provider, and an insurance provider. Upon making such a determination, the self-driving vehicle may be configured to perform automatic maintenance scheduling. The self-driving vehicle controller may retrieve the operator schedule for the operator of the self-driving vehicle. The self-driving vehicle controller may retrieve a facility schedule for a facility selected to perform the maintenance operation. The self-driving vehicle controller may determine a time for performing the maintenance operation based upon the operator schedule, the facility schedule, and/or an amount of time required to (i) complete the maintenance operation, (ii) drive the self-driving vehicle from a first location to the facility to arrive at the determined time, and/or (iii) drive the self-driving vehicle to a second location. The self-driving vehicle controller may determine the first location based upon where the self-driving vehicle is scheduled to be before the maintenance operation, and the second location based upon where the self-driving vehicle is scheduled to be after the maintenance operation.

In some embodiments, the self-driving vehicle controller may also calculate travel time between the first location and the facility and the facility and the second location. The self-driving vehicle may request approval from the operator, via the client system, to perform the maintenance operation at the determined time. Upon receiving approval from the operator, the self-driving vehicle controller may confirm a maintenance appointment with the maintenance facility.

The self-driving vehicle controller may instruct the self-driving vehicle to drive to the facility to arrive at the determined time. The self-driving vehicle controller may check-in at the maintenance facility when it arrives. After completion of the maintenance operation, the self-driving vehicle controller may instruct the self-driving vehicle to drive to a predetermined location.

For example, the self-driving vehicle controller may determine that the self-driving vehicle is due for an oil change. The self-driving vehicle controller retrieves the operator's schedule and the maintenance facility's schedule. The self-driving vehicle controller compares the two schedules. The self-driving vehicle controller determines that the operator will be in the office all day on Wednesday (from 9 AM to 5 PM), that the maintenance facility has an opening at 10 AM, and that the length of time needed to perform the oil change is about one hour. The self-driving vehicle controller transmits a message to the operator's client system requesting approval to perform the oil change at 10 AM on Wednesday. After receiving approval from the operator, the self-driving vehicle controller confirms the appointment with the facility computer device associated with the maintenance facility. On Wednesday at 9:30 AM, the self-driving vehicle controller instructs the self-driving vehicle to drive from the operator's office to the maintenance facility to arrive at 9:55 AM. The self-driving vehicle controller sends a message to the facility computer device to check-in for the maintenance appointment. When the maintenance operation is complete, the self-driving vehicle controller instructs the self-driving vehicle to drive from the maintenance facility to the operator's office. Though this example demonstrates the performance of automatic maintenance scheduling involving an oil change, the self-driving vehicle may perform automatic maintenance scheduling in response to any number of maintenance requirements. Such maintenance requirements may include, for example and without limitation, a re-call notification, a notification of a software and/or electronics upgrade for the self-driving vehicle, an error message that any component of the self-driving vehicle is not functioning properly, an indication that the vehicle is in need of any other periodic maintenance such as a tire rotation, and/or a notification of an expiration of a warranty on the self-driving vehicle.

The methods and system described herein may be implemented using computer programming or engineering techniques including computer software, firmware, hardware, or any combination or subset. As disclosed above, at least one technical problem with prior systems is that there is a need for ensuring that maintenance is performed on self-driving vehicles to ensure safe operation while saving time for the operators of those vehicles. Vehicle maintenance may become even more important in the future as vehicles may become more automated and/or include addition electronics or electronic systems that need to be maintained in safe working condition. The system and methods described herein address that technical problem.

The technical effect of the systems and processes described herein may be achieved by performing at least one of the following steps: (a) determining by vehicle controlling ("VC") computer device that a maintenance operation is required for the self-driving vehicle, wherein the determination is made based upon at least one of the following: (i) receiving an error message from a component of the self-driving vehicle indicating that an error has occurred with the component; (ii) receiving a message from the operator of the self-driving vehicle that a maintenance operation is required; and/or (iii) determining that a predetermined threshold has been exceeded by operation of the self-driving vehicle, wherein the predetermined threshold is one of mileage and time; (b) retrieving an operator schedule for an operator of the self-driving vehicle, wherein the operator schedule includes a plurality of times and locations that the operator is scheduled to be at over a period of time; (c) retrieving a facility schedule for a facility selected to perform the maintenance operation, wherein the facility schedule includes a plurality of times that the facility is available to perform maintenance operations; (d) determining by the VC computer device a time for performing the maintenance operation based upon the operator schedule, the facility schedule, and an amount of time required to (i) complete the maintenance operation, (ii) drive the self-driving vehicle from a first location to the facility to arrive at the determined time, and (iii) drive the self-driving vehicle to a second location; (e) transmitting, to the facility, a tentative appointment at the determined time with the facility; (f) transmitting, to the operator, a request for approval for performing the maintenance operation at the determined time; (g) receiving an affirmative response from the operator; (h) transmitting, to the facility, a confirmation of the tentative appointment; (i) instructing by the VC computer device the self-driving vehicle to drive from the first location to the facility to arrive at the determined time; (j) upon arriving at the facility, transmitting, to the facility, a check-in signal; and/or (k) after completion of the maintenance operation, instructing, by the VC computer device, the self-driving vehicle to drive from the facility the second location, wherein the second location is based upon at least one of the operator schedule, an operator profile, a starting point, and an operator input.

The resulting technical effect is that the self-driving vehicle is properly maintained as set forth by the manufacturer of the self-driving vehicle to ensure proper operation without inconveniencing the operator of the self-driving vehicle. In addition, the system may generate and transmit insurance-related messages to the operator's insurance carrier advising the insurance carrier that the self-driving vehicle has been properly maintained, and may be able to receive messages from the insurance carrier including updates to the vehicle operator's insurance policy (e.g., a change in premium, discount, or rate) that are based upon the maintenance operation information received by the insurance carrier. The insurance-related messages sent from the self-driving vehicle may be received by a remote server maintained by or associated with the insurance provider. Updating and/or adjusting the insurance policy may include recording and/or accessing details regarding the maintenance history (including automatic and/or "manual" maintenance operations) of the self-driving vehicle.

I. EXEMPLARY SELF-DRIVING VEHICLE

FIG. 1 depicts a view of an exemplary self-driving vehicle 100. Self-driving vehicle 100 may be an autonomous vehicle capable of fulfilling the transportation capabilities of a traditional automobile or other vehicle. Self-driving vehicle 100 may be capable of sensing its environment and navigating without human input. Self-driving vehicle 100 may perform all safety-critical functions for the entire trip, with the driver not expected to control the vehicle at any time. As this self-driving vehicle 100 would control all functions from start to stop, including all parking functions, it may include unoccupied vehicles.

Self-driving vehicle 100 may include a plurality of sensors 105 and a self-driving vehicle controller 110. The plurality of sensors 105 may detect the current surroundings and location of self-driving vehicle 100. The plurality of sensors 105 may include, but are not limited to, radar, LIDAR, Global Positioning System (GPS), and computer vision. Self-driving vehicle controller 110 may interpret the sensory information to identify appropriate navigation paths, as well as obstacles and relevant signage. In some embodiments, self-driving vehicle controller 110 may update maps based upon sensory input, allowing self-driving vehicle controller 110 to keep track of self-driving vehicle's 100 position, even when conditions change or when self-driving vehicle 100 enters uncharted environments.

Additionally, self-driving vehicle controller 110 may control the direction and speed of self-driving vehicle 100. Self-driving vehicle controller 110 may allow self-driving vehicle 100 to travel from point A to point B without input from a human operator. In the exemplary embodiment, self-driving vehicle controller 110 may direct self-driving vehicle 100 with a human occupant in self-driving vehicle 100.

While self-driving vehicle 100 may be an automobile in the exemplary embodiment, in other embodiments, self-driving vehicle 100 may be, but is not limited to, other types of ground craft, aircraft, and watercraft vehicles. An operator of self-driving vehicle 100 may be an individual or plurality of individuals associated with self-driving vehicle 100, where the operator may be responsible for the well-maintained operation of self-driving vehicle 100 and/or may use self-driving vehicle 100 on a regular basis. For example, the operator may be an individual owner of self-driving vehicle 100 in the case of a personal automobile. The operator may be a group of people who share access to self-driving vehicle 100, such as a family. Additionally, the operator may be a manager of a fleet of self-driving vehicles 100, such as an automated taxi service.

II. EXEMPLARY COMMUNICATIONS SYSTEM

Figure 2:
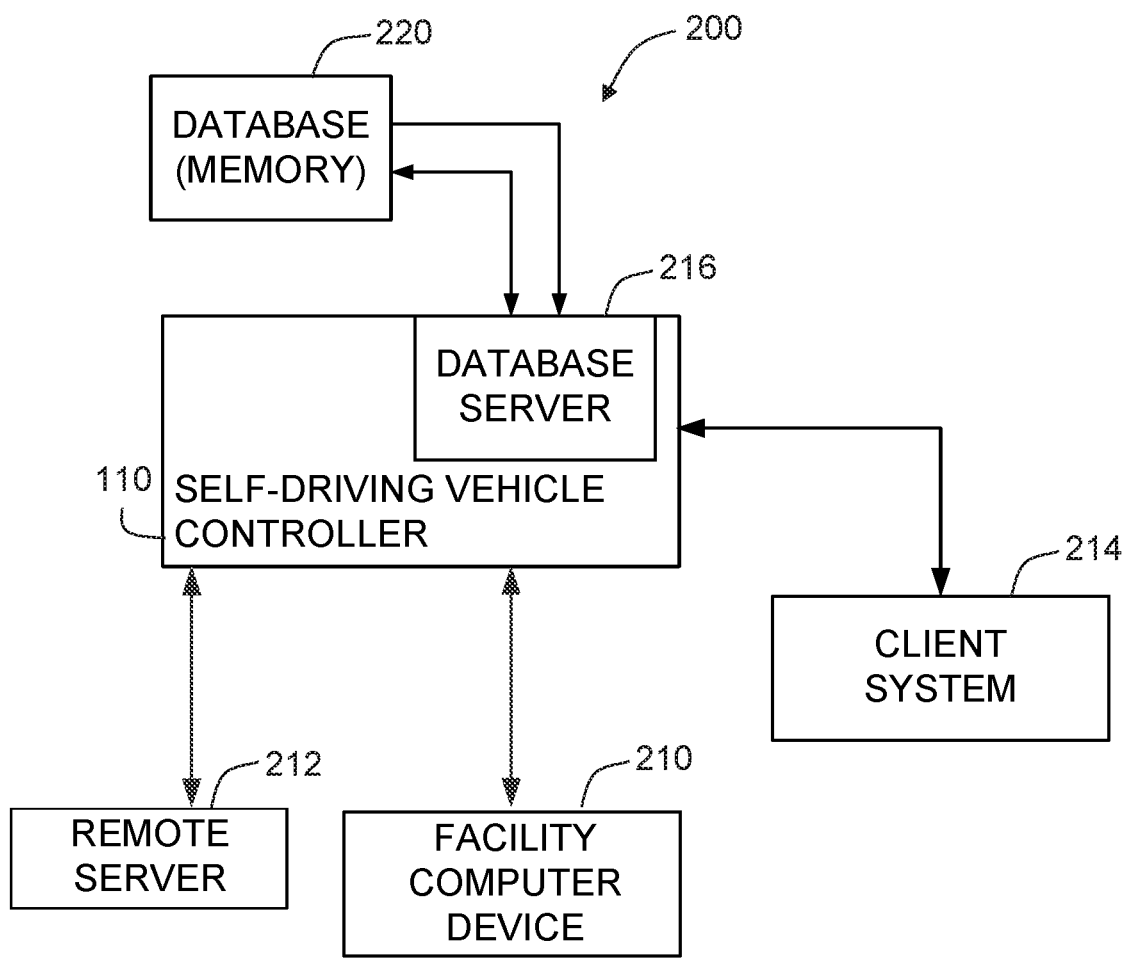
FIG. 2 illustrates a schematic view of an exemplary communications system for maintaining the self-driving vehicle shown in FIG. 1.

FIG. 2 depicts a schematic view of an exemplary communications system 200 for maintaining self-driving vehicle 100 shown in FIG. 1. System 200 includes self-driving vehicle controller 110 (shown in FIG. 1) configured to control self-driving vehicle 100, and schedule maintenance for self-driving vehicle 100. As described below in more detail, self-driving vehicle controller 110 may be configured to determine that a maintenance operation may be required for self-driving vehicle 100, retrieve an operator schedule for an operator of self-driving vehicle 100, retrieve a facility schedule for a facility selected to perform the maintenance operation, determine a time for performing the maintenance operation based upon the operator schedule, the facility schedule, and an amount of time required to (i) complete the maintenance operation, (ii) drive the self-driving vehicle from a first location to the facility to arrive at the determined time, and/or (iii) drive the self-driving vehicle to a second location, instruct self-driving vehicle 100 to drive to the facility to arrive at the determined time, and after completion of the maintenance operation, instruct self-driving vehicle 100 to drive to a predetermined point.

In the exemplary embodiment, client systems 214 may be computers that include a web browser or a software application to enable self-driving vehicle controller 110 to access client system 214 and vice versa using the Internet or a direct connection, such as a cellular network connection. More specifically, client systems 214 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. Additionally, client system 214 may be communicatively coupled to self-driving vehicle controller 110 through many interfaces including, but not limited to, a direct cable connection, a Bluetooth® connection, and a Wi-Fi connection.

In the exemplary embodiment, the operator of self-driving vehicle 100 stores a schedule on client system 214, such as a digital schedule or calendar associated with the operator's or vehicle owner's work schedule and/or home life, and/or family members' digital schedules or calendars. The operator schedule may include a plurality of times and locations where the operator is scheduled to be. For example, a schedule may include, but is not limited to, when the operator will be at work, when the operator will be at home, when the operator will be at meetings away from a primary work location, and/or when the operator is scheduled to transport family members and to what locations those family members are scheduled to be taken.

In the exemplary embodiment, facility computer devices 210 may be computers that include a web browser or a software application to enable self-driving vehicle controller 110 to access facility computer device 210 using the Internet or a direct connection. More specifically, facility computer devices 210 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Facility computer devices 210 may be any device capable of accessing the Internet including, but not limited to, a desktop computer, a laptop computer, a personal digital assistant (PDA), a cellular phone, a smartphone, a tablet, a phablet, other mobile devices, or other web-based connectable equipment. Additionally, facility computer device 210 may be communicatively coupled to self-driving vehicle controller 110 through many interfaces including, but not limited to, a direct cable connection, a Bluetooth® connection, and a Wi-Fi connection.

In the exemplary embodiment, a user associated with a maintenance facility stores a schedule for the maintenance facility on facility computer device 210. The facility schedule may include, but is not limited to, when the maintenance facility is scheduled to perform other maintenance operations, what maintenance operations the maintenance facility is capable of performing, the amount of time needed to perform various maintenance operations, at what times the maintenance facility is available to perform maintenance operations, and/or which mechanic may be available to perform the maintenance.

A database server 216 may be communicatively coupled to a database 220 that stores data. In one embodiment, database 220 may include maintenance operations and an amount of time to perform each maintenance operation, maintenance facilities and the maintenance operations that each maintenance facility may perform, a schedule of one or more of the aforementioned maintenance facilities, and a schedule of one or more operators of self-driving vehicle 100. In some embodiments, database 220 may be stored in self-driving vehicle 100. In some embodiments, database 220 may be stored remotely from self-driving vehicle controller 110. In some embodiments, database 220 may be decentralized.

In the exemplary embodiment, self-driving vehicle controller 110 may further be communicatively coupled to a remote server 212. Remote server 212 may be associated with and/or maintained by any one of a manufacturer of self-driving vehicle 100, a maintenance facility, an owner or operator of self-driving vehicle 100, an insurance provider, or any other third party. Remote server 212 may be configured to determine that self-driving vehicle 100 requires a maintenance operation and transmit messages to self-driving vehicle controller 110 indicating such maintenance is needed. Remote server 212 may be further configured to determine the impact on an insurance policy associated with the vehicle that completion of the maintenance operation may have. Remote server 212 may be further configured to disable any particular function or component of self-driving vehicle 100 until the maintenance operation is completed, for example, to prevent further damage to a particular component.

As described above, self-driving vehicle controller 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, a cable modem, a Wi-Fi connection, and a Bluetooth® connection.

III. EXEMPLARY CLIENT SYSTEM

Figure 3:
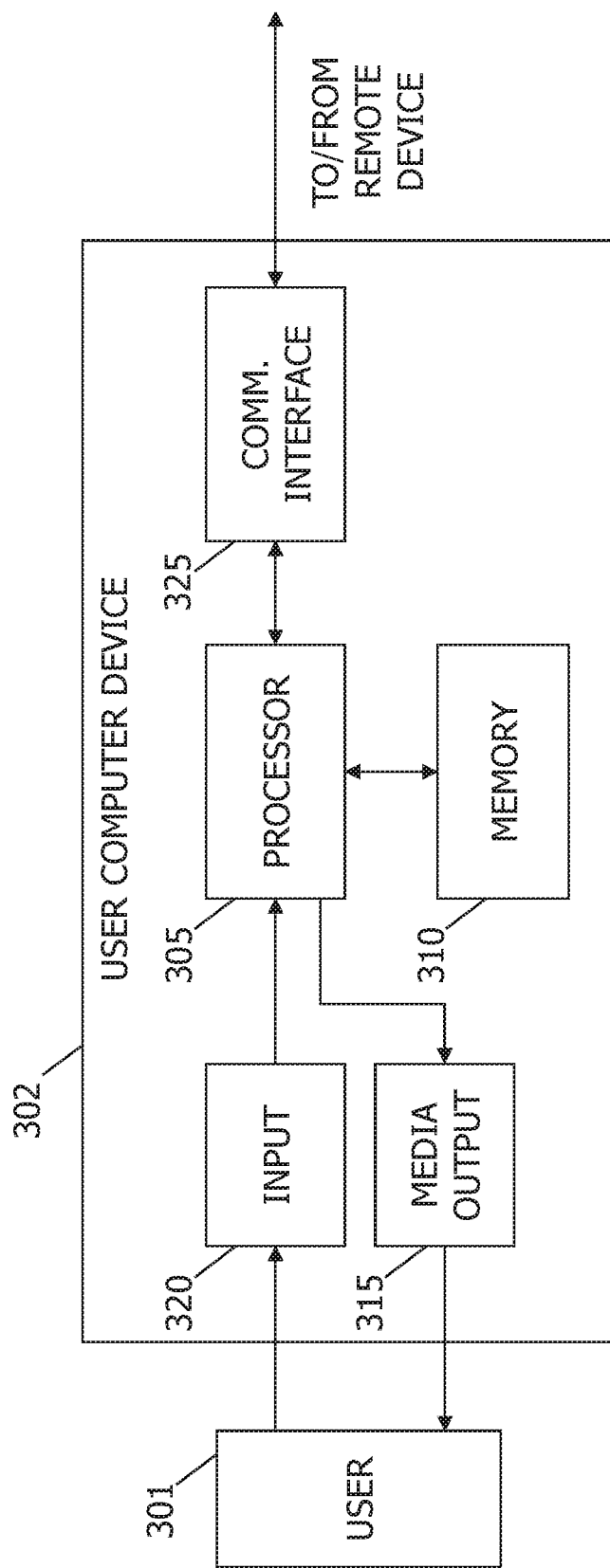
FIG. 3 illustrates an exemplary configuration of an exemplary client system shown in FIG. 2, in accordance with one embodiment of the present disclosure.

FIG. 3 depicts an exemplary configuration of an exemplary client system 214 shown in FIG. 2, in accordance with one embodiment of the present disclosure. User computer device 302 may be operated by a user 301. User computer device 302 may include, but is not limited to, client systems 214 and facility computer device 210 (shown in FIG. 2). User computer device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer-readable media.

User computer device 302 also may include at least one media output component 315 for presenting information to user 301. Media output component 315 may be any component capable of conveying information to user 301. In some embodiments, media output component 315 may include an output adapter (not shown), such as a video adapter and/or an audio adapter. An output adapter may be operatively coupled to processor 305 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. A graphical user interface may include, for example, an online store interface for viewing and/or purchasing items, and/or a wallet application for managing payment information.

In some embodiments, user computer device 302 may include an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as self-driving vehicle controller 110 (shown in FIG. 1). Communication interface 325 may include, for example, a wired or wireless network adapter and/or a wireless data transceiver for use with a mobile telecommunications network.

Stored in memory area 310 may be, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from self-driving vehicle controller 110. A client application may allow user 301 to interact with, for example, self-driving vehicle controller 110. For example, instructions may be stored by a cloud service and the output of the execution of the instructions sent to the media output component 315.

IV. EXEMPLARY SERVER DEVICE

Figure 4:
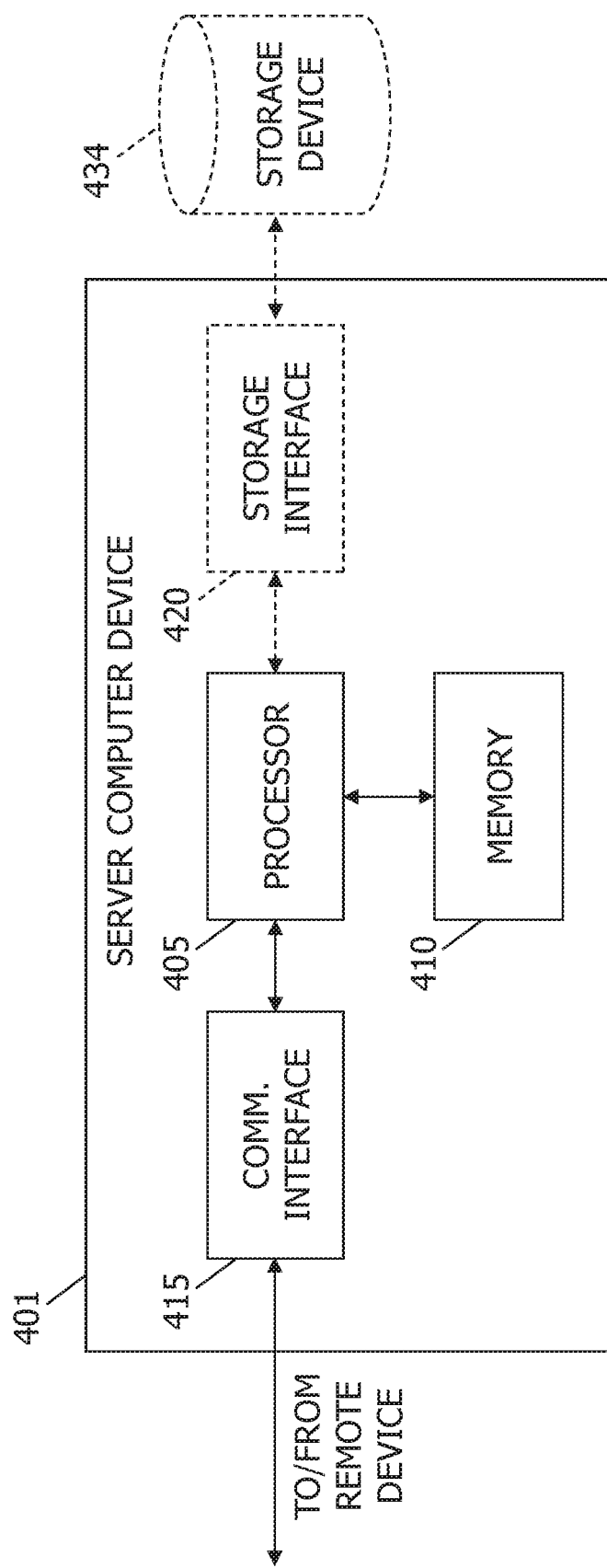
FIG. 4 illustrates an exemplary configuration of an exemplary server computer device shown in FIG. 2, in accordance with one embodiment of the present disclosure.

FIG. 4 depicts an exemplary configuration of an exemplary server computer device shown in FIG. 1, in accordance with one embodiment of the present disclosure. A server computer device 401 may include, but is not limited to, database server 216, remote server 212, and self-driving vehicle controller 110 (all shown in FIG. 2). Server computer device 401 may also include a processor 405 for executing instructions. Instructions may be stored in a memory area 410. Processor 405 may include one or more processing units (e.g., in a multi-core configuration).

Processor 405 may be operatively coupled to a communication interface 415 such that server computer device 401 may be capable of communicating with a remote device such as another server computer device 401, client systems 214, or facility computer device 210 (both shown in FIG. 2). For example, communication interface 415 may receive requests from or transmit requests to client systems 214 via the Internet.

Processor 405 may also be operatively coupled to a storage device 434. Storage device 434 may be any computer-operated hardware suitable for storing and/or retrieving data, such as, but not limited to, data associated with database 220 (shown in FIG. 2). In some embodiments, storage device 434 may be integrated in server computer device 401. For example, server computer device 401 may include one or more hard disk drives as storage device 434. In other embodiments, storage device 434 may be external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 434 via a storage interface 420. Storage interface 420 may be any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 may be transformed into a special purpose microprocessor by executing computer-executable instructions or by otherwise being programmed. For example, processor 405 may be programmed with the instructions such as are illustrated in FIG. 5.

V. EXEMPLARY COMPUTER-IMPLEMENTED METHOD FOR MAINTAINING THE SELF-DRIVING VEHICLE

Figure 5:
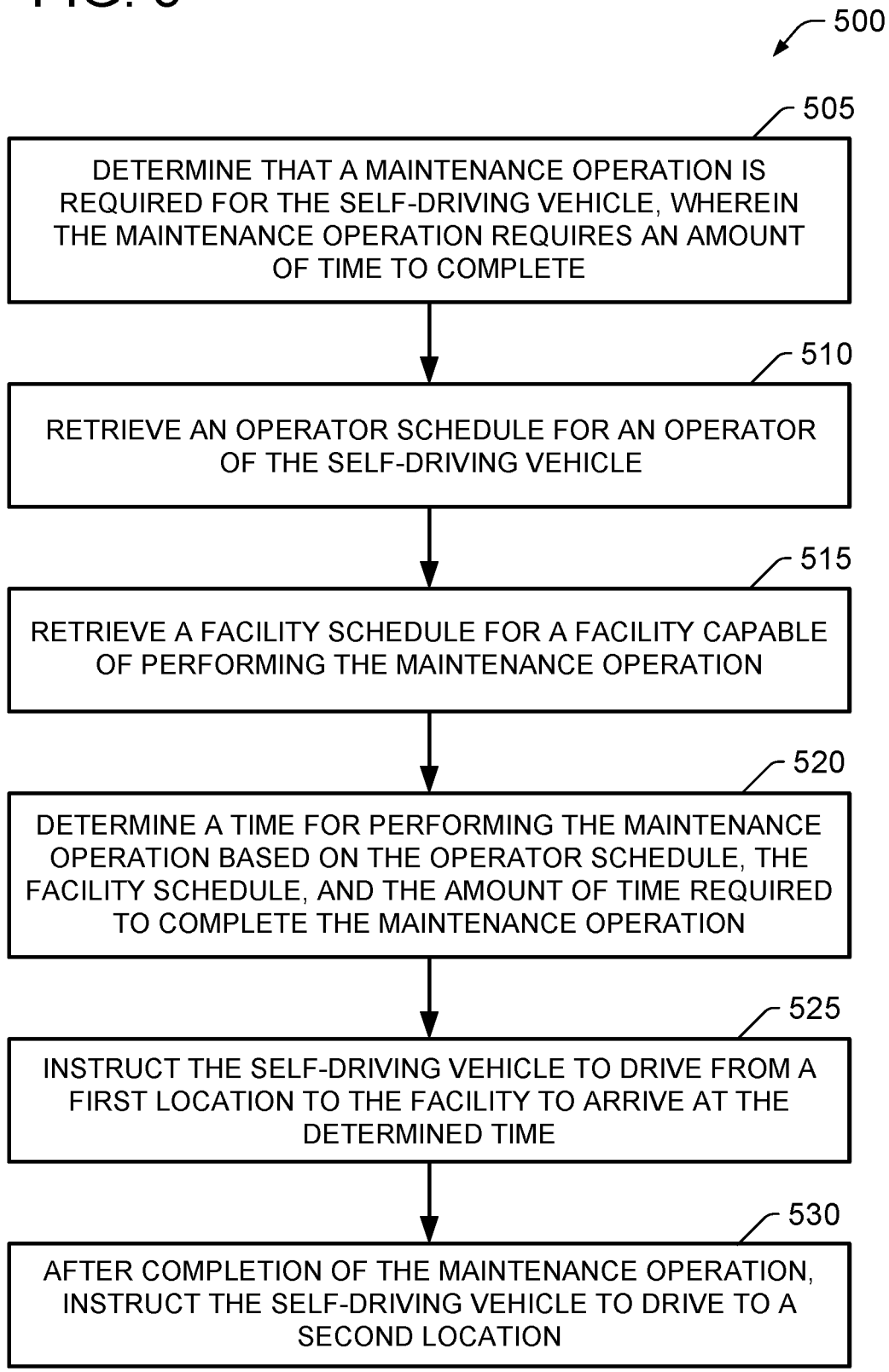
FIG. 5 illustrates a flow chart of an exemplary computer-implemented method for maintaining the self-driving vehicle using the system shown in FIG. 2.

FIG. 5 depicts a flow chart of an exemplary computer-implemented method 500 for maintaining self-driving vehicle 100 (shown in FIG. 1) using system 200 shown in FIG. 2. In the exemplary embodiment, method 500 may be performed by self-driving vehicle controller 110 (shown in FIG. 1).

In the exemplary embodiment, self-driving vehicle controller 110 may determine 505 that a maintenance operation is required for self-driving vehicle 100. While method 500 describes a single maintenance operation, in other embodiments method 500 may be applicable in situations where self-driving vehicle controller 110 determines 505 that multiple maintenance operations are required. Based upon the determination of the maintenance operation being required, self-driving vehicle controller 110 may determine an amount of time needed to perform the maintenance operation. The amount of time may be based upon information stored in database 220 (shown in FIG. 2). In some embodiments, self-driving vehicle controller 110 may receive an error message from a component or system of self-driving vehicle 100, such as sensor 105 (shown in FIG. 1). The error message may indicate that the component or system needs maintenance to be performed.

Self-driving vehicle controller 110 may determine 505 the maintenance operation to be performed by requesting information about the maintenance operations associated with the error message from database 220. In these embodiments, self-driving vehicle controller 110 may determine whether it is safe to operate self-driving vehicle 100 based upon the error message.

In other embodiments, self-driving vehicle controller 110 may determine 505 that a maintenance operation is required based upon a predetermined threshold being reached or exceeded. For example, the predetermined threshold may be related to the number of hours that self-driving vehicle 100 has been operating, a number of miles that self-driving vehicle 100 has traveled, and/or an amount of time since a previous maintenance operation.

In still other embodiments, self-driving vehicle controller 110 may receive a message from the operator of self-driving vehicle 100. The operator message may indicate that self-driving vehicle 100 requires one or more maintenance operations. These operator-initiated maintenance operations may, for example, be for performance issues with self-driving vehicle 100 that self-driving vehicle controller 110 is unable to detect, such as the steering wheel pulling to the right.

In still other embodiments, self-driving vehicle controller 110 may receive a maintenance message from a remote server associated with a vehicle manufacturer of the self-driving vehicle 100, and/or an insurance provider providing insurance for the vehicle operator/owner and/or the self-driving vehicle. The maintenance message may indicate that self-driving vehicle 100 requires one or more maintenance operations. The maintenance operations may be necessary based upon (1) an amount of self-driving vehicle 100 usage or miles; (2) time from last maintenance; (3) autonomous or self-driving vehicle re-calls; (4) autonomous or semi-autonomous vehicle systems, software, or electronics re-calls; and/or (5) autonomous or semi-autonomous vehicle systems, electronics, and/or software upgrades, such as new or upgraded versions of autonomous or semi-autonomous vehicle software.

The maintenance message may also indicate a severity of the maintenance issue, and/or disable certain autonomous or semi-autonomous features until the require maintenance is completed (via interaction with the vehicle controller). Certain maintenance messages may prioritize the maintenance due to the perceived severity of the maintenance required, and/or adjust an operator's schedule or digital calendar accordingly to facilitate timely maintenance completion and vehicle safety.

Self-driving vehicle controller 110 may retrieve 510 an operator schedule for the operator of self-driving vehicle 100 from client system 214 (shown in FIG. 2). The operator schedule may include a plurality of times and locations where the operator is scheduled to be. For example, a schedule may include, but is not limited to, when the operator will be at work, when the operator will be at home, when the operator will be at meetings away from a primary work location, and when the operator is scheduled to transport family members and/or to what locations these family members are scheduled to be taken.

In some embodiments, self-driving vehicle controller 110 may retrieve 510 schedules from client systems 214 associated with a plurality of operators, where each of the plurality of operators is associated with self-driving vehicle 100. An example would be a family where multiple members of the family need to use self-driving vehicle 100. Another example would be a car-sharing program, where multiple individuals organize to share expenses and the use of self-driving vehicle 100.

Self-driving vehicle controller 110 may retrieve 515 a facility schedule for a maintenance facility selected to perform the maintenance operation from facility computer device 210 (shown in FIG. 2). The facility schedule may include, but is not limited to, when the maintenance facility is scheduled to perform other maintenance operations, what maintenance operations the maintenance facility is capable of performing, and/or at what times the maintenance facility is available to perform maintenance operations. In some embodiments, self-driving vehicle controller 110 may retrieve 515 facility schedules from a plurality of facility computer devices 210 to determine which facility is capable of performing the desired maintenance operation. Capability may mean whether the maintenance facility has the equipment and certifications to perform the maintenance operation or whether the maintenance facility has the available time to perform the maintenance operation.

Self-driving vehicle controller 110 may determine 520 a time for performing the maintenance operation based upon the operator schedule, the facility schedule, and/or the amount of time required to complete the maintenance operations. In the exemplary embodiment, self-driving vehicle controller 110 may calculate a total amount of time for the maintenance operation, which may include the amount of time for the maintenance operation, the time for self-driving vehicle 100 to travel from a first location or starting point to the maintenance facility, the time to travel from the maintenance facility to a second location or predetermined point, and/or a buffer amount of time.

Self-driving vehicle controller 110 may determine the time to and from the maintenance facility based upon navigation mapping between the locations and further based upon traffic patterns for the times of day that self-driving vehicle 100 would be traveling. The buffer amount of time may be based upon the average amount of time that the maintenance facility is running behind on appointments, or the buffer amount of time may be predetermined by the operator, the manufacturer, and/or the maintenance facility.

Self-driving vehicle controller 110 may determine the starting point based upon the operator schedule, where the starting point is the location of self-driving vehicle 100 at that time.

In some embodiments, self-driving vehicle controller 110 may compare the total amount of time with the operator schedule to determine one or more available times when the operator has a gap of time with no planned travel or planned use of self-driving vehicle 100 that exceeds the total amount of time. Self-driving vehicle controller 110 may compare the one or more available times with one or more facility schedules to determine a compatible time when at least one of the maintenance facilities has availability to perform the maintenance operation at the one or more available times. In other embodiments, the operator schedule and the one or more facility schedules may be directly compared to find a compatible time of the appropriate length for the maintenance operation.

In the exemplary embodiment, self-driving vehicle controller 110 may retrieve the schedules of multiple maintenance facilities capable of performing the desired maintenance operation. Self-driving vehicle controller 110 may limit the maintenance facilities that it retrieves schedules from based upon distance from the starting location. Additionally, if self-driving vehicle controller 110 is unable to determine a compatible time to perform the maintenance operation within a certain period of time, i.e., two weeks, self-driving vehicle controller 110 may look at schedules for additional facilities that may be farther away from the starting location.

In the exemplary embodiment once self-driving vehicle controller 110 has determined a compatible time for a maintenance appointment at a maintenance facility, self-driving vehicle controller 110 may communicate with the corresponding facility computer device 210 to reserve a maintenance appointment at the compatible time. Self-driving vehicle controller 110 may transmit, to the operator of self-driving vehicle 100, a request for approval to perform the maintenance operation at the determined time. In some embodiments, self-driving vehicle controller 110 may transmit this request via an email or text message to client system 214.

Once self-driving vehicle controller 110 receives an affirmative reply (i.e., message) from the operator of self-driving vehicle 100, self-driving vehicle controller 110 may confirm the maintenance appointment with facility computer device 210. If self-driving vehicle controller 110 receives a negative reply from the operator, self-driving vehicle controller 110 may cancel the maintenance appointment with facility computer device 210 and determine 520 a different time to perform the maintenance operation.

At the appropriate time, self-driving vehicle controller 110 may instruct 525 self-driving vehicle 100 to drive to the maintenance facility to arrive at the time of the maintenance appointment. When self-driving vehicle 100 arrives at the maintenance facility, self-driving vehicle controller 110 may check in with facility computer device 210. For example, self-driving vehicle controller 110 may send a signal to facility computer device 210 to indicate that self-driving vehicle 100 has arrived at the maintenance facility for the maintenance appointment.

After completion of the maintenance operation, self-driving vehicle controller 110 may instruct 530 self-driving vehicle 100 to drive to the second location. In some embodiments, the second location may be the same as the starting point. In other embodiments, the second location may be a location where a different operator will use self-driving vehicle 100. In still other embodiments, the second location may be a known waiting point for self-driving vehicle 100, such as a garage. In some embodiments, the second location may be based upon a user profile of the operator of self-driving vehicle 100. In some further embodiments, self-driving vehicle controller 110 may receive a message from an operator indicating an updated location where the self-driving vehicle 100 should travel to after the maintenance operation is complete. For example, if completion of the maintenance operation is delayed, then the operator may change the second location while the maintenance operation is being performed.

VI. EXEMPLARY COMPUTER DEVICE FOR MAINTAINING THE SELF-DRIVING VEHICLE

Figure 6:
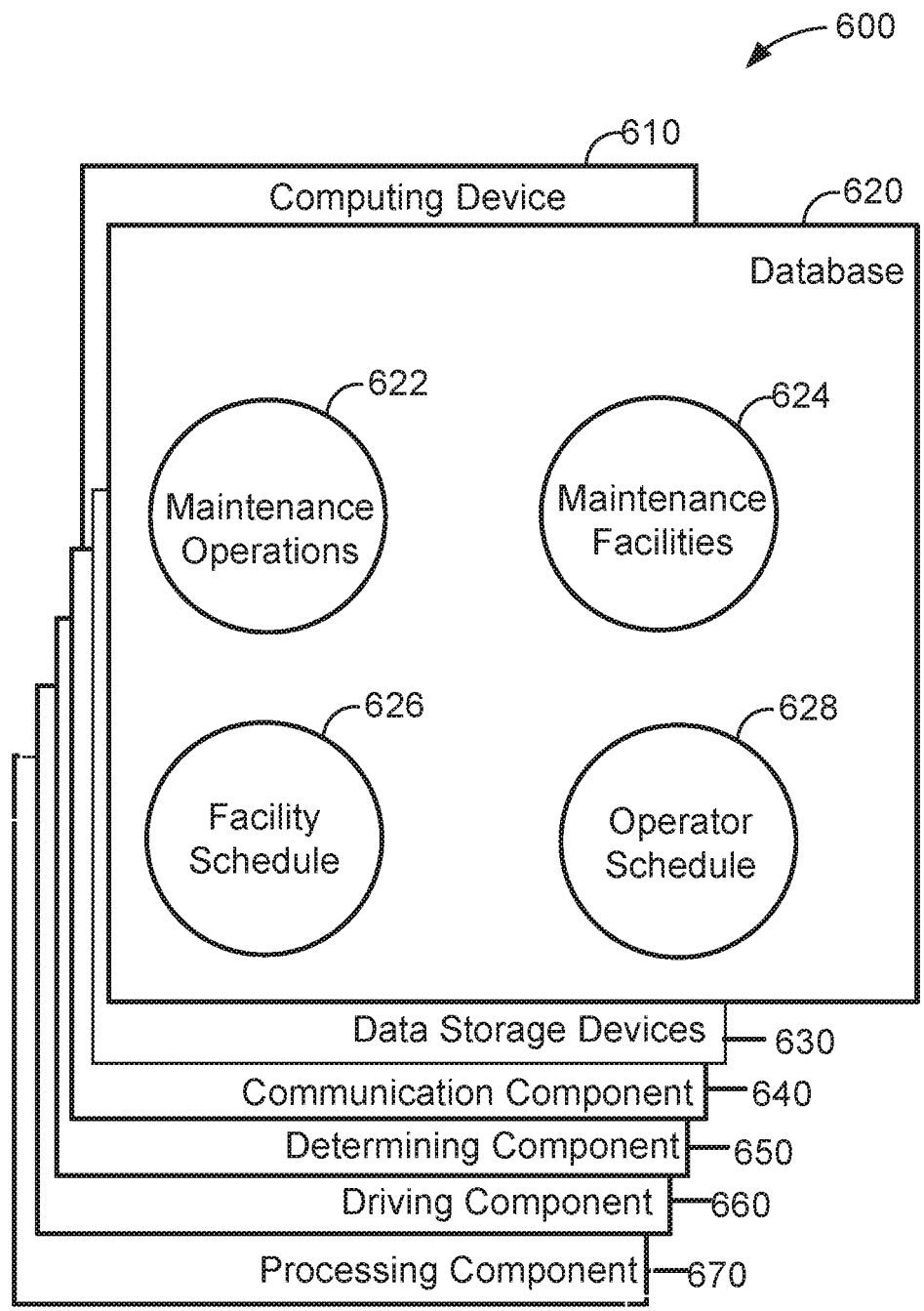
FIG. 6 illustrates a diagram of components of one or more exemplary computing devices that may be used in the system shown in FIG. 2.

FIG. 6 depicts a diagram 600 of components of one or more exemplary computing devices that may be used in system 200 shown in FIG. 2. In some embodiments, computing device 610 may be similar to self-driving vehicle controller 110 (shown in FIG. 1) and/or to remote server 212 (shown in FIG. 2). Database 620 may be coupled with several separate components within computing device 610, which perform specific tasks. In this embodiment, database 620 may include maintenance operations 622, maintenance facilities 624, facility schedules 626, and operator schedules 628. In some embodiments, database 620 may be similar to database 220 (shown in FIG. 2).

Computing device 610 may include database 620, as well as data storage devices 630. Computing device 610 also may include a communication component 640 for retrieving 510 an operator schedule and retrieving 515 a facility schedule (both shown in FIG. 5). Computing device 610 further may include a determining component 650 for determining 505 that a maintenance operation is required and determining 520 a time for performing the maintenance operation (both shown in FIG. 5). Moreover, computing device 610 may include an instructing component 660 for instructing 525 self-driving vehicle to drive to the facility and instructing 530 self-driving vehicle to drive to a predetermined point (both shown in FIG. 5). A processing component 670 may assists with execution of computer-executable instructions associated with the system.

VII. EXEMPLARY INSURANCE-RELATED FUNCTIONALITY

In another aspect, a computer-implemented method of monitoring maintenance performed on a self-driving vehicle may be provided. The method may include (1) collecting, generating, or receiving, via one or more processors (such as processors or servers associated with an insurance provider), maintenance operation information from a self-driving vehicle controller associated with a self-driving vehicle; (2) determining or detecting, via the one or more processors, which maintenance operations were performed on the self-driving vehicle and/or when those maintenance operations were performed based upon the maintenance operation information; (3) comparing, via the one or more processors, the performed maintenance operations with a manufacturer's maintenance required schedule for the self-driving vehicle; and/or (4) transmitting, via the one or more processors, such as by using wireless communication or data transmission, the insurance-related message to a mobile device of a vehicle owner (or otherwise causing, via the one or more processors, the insurance-related message to be displayed on the mobile device of the vehicle operator or a policy holder of an insurance policy that may relate to the vehicle) to facilitate informing the vehicle operator of potentially required or needed maintenance operation for the safe and proper operation of the self-driving vehicle. The method may include additional, less, or alternate functionality, including that discussed elsewhere herein.

For instance, the self-driving vehicle controller may transmit maintenance operation information every time a maintenance operation is performed on self-driving vehicle, or self-driving vehicle controller may store maintenance operation information and transmit the stored maintenance operation information in batches on a recurring basis, upon request from a server associated with the insurance provider, and/or upon an input from the operator of the self-driving vehicle. The maintenance operation information may include which maintenance operations were performed on self-driving vehicle, when those maintenance operations were performed, which facility performed the maintenance operations, which maintenance operations were scheduled but not performed, which maintenance operations are needed and/or required but have not yet been performed, any warnings that the self-driving vehicle controller has detected, and/or the mileage and current operating hours of the self-driving vehicle.

The insurance-related message may include an update to a vehicle operator insurance policy, such as a change in premium, discount, or rate based upon the maintenance operation information received for an insurance customer's review or approval.

Additionally or alternatively, the method may include adjusting, updating, and/or generating, via one or more processors, insurance policies based upon maintenance operation information. For instance, discounts or lower premiums on vehicle insurance for insureds that have the self-driving vehicles that have performed all of the required and/or needed maintenance operations to ensure safe and proper operation of the self-driving vehicle.

VIII. EXEMPLARY EMBODIMENTS & METHODS

The present embodiments may provide a high level of safety and a least amount of impact to smart vehicle owners. Autonomous or semi-autonomous vehicles may automatically determine and/or schedule preventive and corrective maintenance, such as according to the vehicle owner's online calendar and vehicle dealership availability, and may even drive themselves to maintenance appointments and check in with the dealership (or other repair shop) when they have arrived. Additionally or alternatively, the vehicle owner or operator may schedule maintenance for issues that the vehicle is not self-aware of through the vehicle's own self diagnostics.

With autonomous vehicles driving themselves to maintenance appointments, time savings for the vehicle owner will be provided and/or operational safety of the vehicle may be ensured/enhanced by timely correction of vehicle or maintenance issues. The vehicle or maintenance issues may relate to the electronics, sensors, sensor arrays, systems, sub-systems, and/or software that provide autonomous or semi-autonomous vehicle technology or functionality. Such electronics, sensors, sensor arrays, systems, sub-systems, or software may be subject to various re-calls, system upgrades or enhancements, warranty expirations, periodic checks or maintenance, and/or revised software versions over time. Additionally or alternatively, the autonomous or semi-autonomous vehicles may have advanced self-diagnostic capabilities to ensure they are performing in a safe manner and/or detect systems or components that are in need of repair. Timely updating the autonomous or semi-autonomous vehicle technology or functionality (and/or providing timely maintenance for the vehicles) may become an important road safety issue that the present embodiments address.

In one aspect, a computer-implemented method of scheduling maintenance for an autonomous vehicle may be provided. The method may include (1) receiving, via one or more processors (such as a processor mounted on an autonomous vehicle or an insurance provider remote server), an indication that an autonomous vehicle technology or functionality of an autonomous vehicle is in need of maintenance; (2) scheduling, via the one or more processors, maintenance to repair the autonomous vehicle technology or functionality based upon (a) repair shop (or vehicle dealership) availability, and/or (b) autonomous vehicle availability, the autonomous vehicle availability determined at least in part on a vehicle owner's electronic calendar; and/or (3) directing, via the one or more processors, the autonomous vehicle to drive itself to the repair shop at a given time to facilitate the repair shop completing the maintenance. The method may include additional, less, or alternate functionality, including that discussed elsewhere herein.

For instance, the method may include adjusting, via one or more processors, an insurance policy associated with the autonomous vehicle based upon the autonomous vehicle having the auto maintenance functionality and/or based upon timely completing of the required maintenance. The method may further include directing, via the one or more processors, the autonomous vehicle to drive itself to the vehicle owner's home or work address after the maintenance is completed.

The indication that the autonomous vehicle technology or functionality is in need of maintenance may be generated from vehicle mounted electronics performing self-diagnostics. Additionally or alternatively, the indication that the autonomous vehicle technology or functionality is in need of maintenance may be generated from a remote server (such as an insurance provider or vehicle manufacturer remote server) and/or may be based upon a re-call or upgrade to an autonomous vehicle technology or functionality (such as a sensor or software upgrade or re-call), or a warranty expiration notice associated with the autonomous vehicle technology or functionality.

In another aspect, a computer-implemented method of updating an insurance policy for an autonomous vehicle may be provided. The method may include (1) receiving, via one or more processors (such as a processor mounted on an autonomous vehicle or a vehicle manufacturer remote server), an indication that an autonomous vehicle technology or functionality may be in need of maintenance for an autonomous vehicle covered by an insurance policy issued by an insurance provider; (2) scheduling, via the one or more processors (such as via wireless communication or data transmission), maintenance to repair the autonomous vehicle technology or functionality based upon (i) repair shop availability, and/or (ii) autonomous vehicle availability, the autonomous vehicle availability determined at least in part on a vehicle owner's or an insured's electronic calendar and/or an autonomous vehicle schedule or electronic calendar; (3) directing, via the one or more processors, the autonomous vehicle to drive itself to the repair shop at a given time (such as a time based upon (i) the repair shop availability, and/or (ii) the autonomous vehicle availability), to facilitate the repair shop completing the maintenance; (4) receiving, via the one or more processors, notification that the maintenance was completed from a computing device (such as a vehicle controller of the autonomous vehicle, or a mobile or computing device associated with the repair shop or vehicle owner); and/or (5) updating, via the one or more processors, an insurance policy for the autonomous vehicle and/or vehicle owner based upon the completion of the required maintenance to the autonomous technology or functionality in need of repair. The method may include additional, less, or alternate functionality, including that discussed elsewhere herein.

For instance, the method may further include directing, via the one or more processors, the autonomous vehicle to drive itself to the vehicle owner's home or work address after the maintenance is completed. The indication that the autonomous vehicle technology or functionality is in need of maintenance may be generated from vehicle-mounted electronics performing self-diagnostics. Additionally or alternatively, the indication that the autonomous vehicle technology or functionality is in need of maintenance may be generated from a remote server (such as an insurance provider or vehicle manufacturer remote server) and/or may be based upon a re-call or upgrade to an autonomous vehicle technology or functionality (such as a sensor or software upgrade or re-call), or warranty or periodic maintenance information or schedules.

In another aspect, a computer-based method for scheduling maintenance for a self-driving vehicle may be provided. The method may include (1) determining, by a remote server in communication with the self-driving vehicle, that a maintenance operation is required for the self-driving vehicle; and (2) generating, by the remote server, a first message representing the maintenance operation required for the self-driving vehicle. The method may also include (3) transmitting, by the remote server, the first message to the self-driving vehicle, wherein the first message causes the self-driving vehicle to perform automatic maintenance scheduling, the automatic maintenance scheduling including: (a) retrieving an operator schedule for an operator of the self-driving vehicle, wherein the operator schedule includes a plurality of times and locations that the operator is scheduled to be at over a period of time; (b) retrieving a facility schedule for a facility selected to perform the maintenance operation, wherein the facility schedule includes a plurality of times that the facility is available to perform maintenance operations; (c) determining a time for performing the maintenance operation based upon the operator schedule, the facility schedule, and an amount of time required to (i) complete the maintenance operation, (ii) drive the self-driving vehicle from a first location to the facility to arrive at the determined time, and (iii) drive the self-driving vehicle to a second location; and (d) driving from the first location to the facility to arrive at the determined time. In addition, the method may include receiving, from the self-driving vehicle, a second message representing that the maintenance operation is complete. The method may include additional, less, or alternate functionality, including that discussed elsewhere herein.

For instance, the method may include determining, by the remote server, that the self-driving vehicle is capable of performing the automatic maintenance scheduling; and based on the determining step, adjusting an insurance policy associated with the self-driving vehicle. Additionally or alternatively, the method may include receiving, by the remote server, a notification that the maintenance operation is complete; and updating, by the remote server, an insurance policy associated with the self-driving vehicle based on the completion of the maintenance operation. Adjusting an insurance policy associated with the self-driving vehicle may include storing maintenance data for the self-driving vehicle in a database and adjusting an amount (e.g., a premium or rate) charged by the insurance provider to insure the self-driving vehicle. Additionally or alternatively, the method may include disabling, by the remote server, a component of the self-driving vehicle in need of maintenance; and restoring, by the remote server, the component of the self-driving vehicle after completion of the maintenance operation.

IX. ADDITIONAL EXEMPLARY METHODS

In one aspect, a computer-implemented method of performing maintenance on an autonomous or semi-autonomous vehicle may be provided. The method may include (1) receiving, via one or more processors (such as a processor or remote server associated with an insurance provider, a vehicle dealership, and/or a vehicle manufacturer), an indication that an autonomous or semi-autonomous vehicle functionality or technology is in need of repair or maintenance, such as subject to a vehicle re-call, subject to an electronics or software upgrade, not operating properly, periodic maintenance (oil changes, rotating tires, diagnostic checks, etc.), warranty expiration, and/or otherwise in need of repair (such as via wireless communication or data transmission from an autonomous or semi-autonomous vehicle functionality or technology manufacturer, or a vehicle manufacturer); (2) identifying, via the one or more processors, a vehicle owner and/or an autonomous or semi-autonomous vehicle having the autonomous or semi-autonomous vehicle functionality or technology in need of repair; (3) scheduling maintenance (such as a date and time of a maintenance appointment), via the one or more processors, for the vehicle owner and/or an autonomous or semi-autonomous vehicle having the autonomous or semi-autonomous vehicle functionality or technology in need of repair, such as by comparing an electronic calendar of the vehicle owner and/or autonomous or semi-autonomous vehicle) with a repair shop's availability to complete the repair or maintenance; and/or (4) causing or directing, via the one or more processors, the autonomous or semi-autonomous vehicle to drive itself (such as from a home or work address of the vehicle owner) to the repair shop (or vehicle dealership) at a designated time and/or place of a maintenance appointment to facilitate the autonomous or semi-autonomous vehicle functionality or technology in need of repair or maintenance being timely repaired or fixed such that vehicle or road safety may be enhanced.

In another aspect, a computer-implemented method of performing maintenance on an autonomous or semi-autonomous vehicle may be provided. The method may include (1) receiving, via one or more vehicle-mounted processors (such as a smart vehicle controller mounted on an autonomous or semi-autonomous vehicle), an indication that an autonomous or semi-autonomous vehicle functionality or technology (of the autonomous or semi-autonomous vehicle) is in need of repair or maintenance, such as subject to a vehicle re-call, subject to an electronics or software upgrade, not operating properly, in need of periodic maintenance (oil changes, rotating tires, diagnostic checks, etc.), and/or otherwise in need of repair (such as receiving the indication via wireless communication or data transmission from an autonomous or semi-autonomous vehicle functionality or technology manufacturer, a vehicle manufacturer, a vehicle dealership, and/or an insurance provider); (2) scheduling maintenance, via the one or more vehicle-mounted processors, for the vehicle owner and/or the autonomous or semi-autonomous vehicle having the autonomous or semi-autonomous vehicle functionality or technology in need of repair, such as by comparing an electronic calendar and/or location(s) of the vehicle owner (and/or the autonomous or semi-autonomous vehicle) with a repair shop's availability to complete the repair or maintenance; and/or (3) causing or directing, via the one or more vehicle-mounted processors, the autonomous or semi-autonomous vehicle to drive itself to the repair shop at a designated time and/or place of a maintenance appointment to facilitate the autonomous or semi-autonomous vehicle functionality or technology in need of repair or maintenance being timely repaired or fixed by the repair shop such that vehicle or road safety may be enhanced.

In another aspect, a computer-implemented method of performing maintenance on an autonomous or semi-autonomous vehicle may be provided. The method may include (1) receiving, via one or more processors (such as at a processor or remote server associated with an insurance provider, a vehicle dealership, and/or a vehicle manufacturer), an indication that an autonomous or semi-autonomous vehicle functionality or technology is in need of repair or maintenance, such as subject to a vehicle re-call, subject to an electronics or software upgrade, not operating properly, in need of periodic maintenance (oil changes, rotating tires, diagnostic checks, etc.), and/or otherwise in need of repair (such as receiving the indication via wireless communication or data transmission from an autonomous or semi-autonomous vehicle functionality or technology manufacturer, and/or a vehicle manufacturer); (2) identifying, via the one or more processors, a vehicle owner and/or an autonomous or semi-autonomous vehicle associated with, or having, the autonomous or semi-autonomous vehicle functionality or technology in need of repair; (3) generating, via the one or more processors, a message to the vehicle owner and/or the autonomous or semi-autonomous vehicle indicating that the autonomous or semi-autonomous vehicle functionality or technology is in need of repair or maintenance; and/or (4) sending or transmitting, via the one or more processors, the message to the vehicle owner mobile device and/or a vehicle controller of the autonomous or semi-autonomous vehicle indicating that the autonomous or semi-autonomous vehicle functionality or technology is in need of repair or maintenance to facilitate (i) the vehicle owner mobile device, and/or (ii) the vehicle controller of the autonomous or semi-autonomous vehicle (a) automatically scheduling maintenance with a repair shop to complete the needed repairs or maintenance, and/or (b) directing or otherwise causing the autonomous or semi-autonomous vehicle to drive itself to an maintenance appointment such that vehicle safety may be enhanced.

In another aspect, a computer-implemented method of performing maintenance on an autonomous or semi-autonomous vehicle may be provided. The method may include (1) determining, via one or more processors (such as a vehicle-mounted controller, a processor or remote server associated with an insurance provider, and/or a vehicle dealership), maintenance or repair is needed for an autonomous or semi-autonomous vehicle (such as an autonomous or semi-autonomous vehicle functionality or technology of the autonomous or semi-autonomous vehicle is in need of periodic maintenance, maintenance associated with a warranty, and/or repair; subject to a vehicle re-call; and/or subject to an electronics or software upgrade); (2) scheduling a date and time of a maintenance appointment for the maintenance or repair, via the one or more processors, for the autonomous or semi-autonomous vehicle based upon one or more electronic calendars associated with schedules of the vehicle owner, the autonomous or semi-autonomous vehicle, and/or a vehicle dealership or repair shop, and/or based upon a severity level of the maintenance or repair; and/or (3) causing or directing, via the one or more processors, the autonomous or semi-autonomous vehicle to drive from a home or work location of the vehicle owner to the vehicle dealership or repair shop at the date and time of the maintenance appointment to facilitate maintenance or repair completion.

The foregoing methods may include additional, less, or alternate actions, including that discussed elsewhere herein. For instance, the methods may further include receiving, via one or more remote processors (such as at an insurance provider remote server), an electronic indication that the maintenance or repair of the autonomous vehicle functionality or technology has been successfully completed; and/or adjusting or updating, via the one or more remote processors, an insurance policy (such as premium, discount, rate) based upon completion of the maintaining a self-driving vehicle, the method implemented using a vehicle The methods may further include causing or directing, via the one or more processors, the autonomous or semi-autonomous vehicle to drive from the vehicle dealership or repair shop to the home or work address of the vehicle owner after completion of the maintenance to facilitate maintenance or repair completion. The methods may further include disabling, via the one or more processors, the autonomous or semi-autonomous vehicle functionality or technology that is in need repair or maintenance after notification of the needed repair or maintenance is received, and/or until the needed repair or maintenance is successfully completed; and/or restoring operation of the autonomous or semi-autonomous vehicle functionality or technology after the needed repair or maintenance is successfully completed.

The methods may include adjusting, via one or more processors, an insurance policy associated with the autonomous vehicle based upon the autonomous vehicle having the auto maintenance functionality and/or based upon timely completing of the required maintenance. The indication that the autonomous vehicle technology or functionality is in need of maintenance may be generated from vehicle mounted electronics performing self-diagnostics. Additionally or alternatively, the indication that the autonomous vehicle technology or functionality is in need of maintenance may be generated from a remote server (such as an insurance provider or vehicle manufacturer remote server) and/or based upon a re-call or upgrade to an autonomous vehicle technology or functionality (such as a sensor or software upgrade or re-call), or a warranty expiration notice associated with the autonomous vehicle technology or functionality.

X. ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-based method for maintaining a self-driving vehicle, the method implemented using a vehicle controlling ("VC") computer device installed on the self-driving vehicle, the VC computer device in communication with a memory, the method comprising:
   determining, by the VC computer device, that a maintenance operation is required for the self-driving vehicle;
   electronically retrieving, by the VC computer device, a plurality of facility schedules from a corresponding plurality of facility computing devices in networked connection with the VC computing device, wherein each facility schedule of the plurality of facility schedules includes an identification of maintenance operations capable of being performed by a respective facility and a plurality of times that the respective facility is available to perform the maintenance operations;
   selecting, by the VC computing device, a facility capable of performing the required maintenance operation based upon the plurality of facility schedules and at least one of the required maintenance operation and an operator schedule for an operator of the self-driving vehicle;
   determining, by the VC computer device, a time for performing the required maintenance operation based upon the operator schedule, the facility schedule of the selected facility, and an amount of time required to (i) complete the required maintenance operation, (ii) drive the self-driving vehicle from a first location to the selected facility to arrive at the determined time, and (iii) drive the self-driving vehicle to a second location; and
   controlling, by the VC computer device, the self-driving vehicle to drive from the first location to the selected facility to arrive at the determined time.

2. The computer-based method of claim 1, wherein determining that a maintenance operation is required further comprises receiving an error message from a component of the self-driving vehicle indicating that an error has occurred with the component, the method further comprising determining whether the self-driving vehicle is capable of safe operation based upon the received error message.

3. The computer-based method of claim 1 further comprising:
   transmitting a first message to a remote server associated with an insurance provider indicating completion of the required maintenance operation; and receiving a second message from the remote server indicating an update to an insurance policy associated with the self-driving vehicle based upon the first message.

4. The computer-based method of claim 1, wherein determining that a maintenance operation is required further comprises receiving a message that a maintenance operation is required from one of the operator of the self-driving vehicle and a remote server.

5. The computer-based method of claim 1, wherein determining that a maintenance operation is required further comprises determining that a predetermined threshold has been exceeded by operation of the self-driving vehicle, wherein the predetermined threshold is one of mileage and time.

6. The computer-based method of claim 1 further comprising:
transmitting, to the respective facility computing device associated with the selected facility, a tentative appointment at the determined time with the selected facility;
transmitting, to the operator, a request for approval for performing the required maintenance operation at the determined time;
receiving an affirmative response from the operator; and
transmitting, to the facility computing device, a confirmation of the tentative appointment.

7. The computer-based method of claim 1, wherein the second location is based upon at least one of the operator schedule, an operator profile, a starting point, and an operator input.

8. A vehicle controlling ("VC") computer system used to schedule and perform maintenance on a self-driving vehicle, the VC computer system installed in a self-driving vehicle, the VC computer system comprising:
at least one non-transitory memory device storing executable instructions; and
at least one processor communicatively coupled to the at least one non-transitory memory device, the at least one processor programmed to:
determine that a maintenance operation is required for the self-driving vehicle;
electronically retrieve a plurality of facility schedules from a corresponding plurality of facility computing devices in networked connection with the VC computing device, wherein each facility schedule of the plurality of facility schedules includes an identification of maintenance operations capable of being performed by a respective facility and a plurality of times that the respective facility is available to perform the maintenance operations;
select a facility capable of performing the required maintenance operation based upon the plurality of facility schedules and at least one of the required maintenance operation and an operator schedule for an operator of the self-driving vehicle;
determine a time for performing the required maintenance operation based upon the operator schedule, the facility schedule of the selected facility, and an amount of time required to (i) complete the required maintenance operation, (ii) drive the self-driving vehicle from a first location to the selected facility to arrive at the determined time, and (iii) drive the self-driving vehicle to a second location; and
control the self-driving vehicle to drive from the first location to the selected facility to arrive at the determined time.

9. The VC computer system of claim 8, wherein the at least one processor is further programmed to receive an error message from a component of the self-driving vehicle indicating that an error has occurred with the component.

10. The VC computer system of claim 8, wherein the at least one processor is further programmed to receive a message from the operator of the self-driving vehicle that a maintenance operation is required.

11. The VC computer system of claim 8, wherein the at least one processor is further programmed to determine that a predetermined threshold has been exceeded by operation of the self-driving vehicle, wherein the predetermined threshold is one of mileage and time.

12. The VC computer system of claim 8, wherein the at least one processor is further programmed to:
transmit, to the respective facility computing device associated with the respective facility, a tentative appointment at the determined time with the selected facility;
transmit, to the operator, a request for approval for performing the required maintenance operation at the determined time;
receive an affirmative response from the operator; and
transmit, to the selected facility, a confirmation of the tentative appointment.

13. The VC computer system of claim 8, wherein the second location is based upon at least one of the operator schedule, an operator profile, a starting point, and an operator input.

14. At least one non-transitory computer-readable storage media having computer-executable instructions embodied thereon, wherein when executed by at least one processor, the computer-executable instructions cause the at least one processor to:
determine that a maintenance operation is required for a self-driving vehicle;
electronically retrieve a plurality of facility schedules from a corresponding plurality of facility computing devices in networked connection with the VC computing device, wherein each facility schedule of the plurality of facility schedules includes an identification of maintenance operations capable of being performed by a respective facility and a plurality of times that the respective facility is available to perform the maintenance operations;
select a facility capable of performing the required maintenance operation based upon the plurality of facility schedules and at least one of the required maintenance operation and an operator schedule for an operator of the self-driving vehicle;
determine a time for performing the required maintenance operation based upon the operator schedule, the facility schedule of the selected facility, and an amount of time required to (i) complete the required maintenance operation, (ii) drive the self-driving vehicle from a first location to the selected facility to arrive at the determined time, and (iii) drive the self-driving vehicle to a second location; and
control the self-driving vehicle to drive from the first location to the selected facility to arrive at the determined time.

15. The computer-readable storage media of claim 14, wherein the computer-executable instructions further cause the at least one processor to determine that a maintenance operation is required for a self-driving vehicle based upon at least one of an error message from a component of the self-driving vehicle indicating that an error has occurred with the component, a message from the operator of the self-driving vehicle that a maintenance operation is required and exceeding a predetermined threshold by operation of the self-driving vehicle, wherein the predetermined threshold is one of mileage and time.

16. The computer-readable storage media of claim 14, wherein the computer-executable instructions further cause the at least one processor to:
   transmit, to the selected facility, a tentative appointment at the determined time with the selected facility.

17. The computer-readable storage media of claim 16, wherein the computer-executable instructions further cause the at least one processor to:
   transmit, to the operator, a request for approval for performing the required maintenance operation at the determined time.

18. The computer-readable storage media of claim 17, wherein the computer-executable instructions further cause the at least one processor to:
   receive an affirmative response from the operator;
   transmit, to the selected facility, a confirmation of the tentative appointment; and
   transmit, to the selected facility, a check-in signal, upon arriving at the selected facility.

19. The computer-readable storage media of claim 14, wherein the computer-executable instructions further cause the at least one processor to:
   disable a component of the self-driving vehicle in need of maintenance.

20. The computer-readable storage media of claim 19, wherein the computer-executable instructions further cause the at least one processor to:
   restore the component of the self-driving vehicle after completion of the required maintenance operation.

\* \* \* \* \*